(12) United States Patent
Zhang et al.

(10) Patent No.: US 9,413,769 B2
(45) Date of Patent: Aug. 9, 2016

(54) KEY MANAGEMENT SYSTEM FOR TOLL-FREE DATA SERVICE

(71) Applicant: Verizon Patent and Licensing Inc., Arlington, VA (US)

(72) Inventors: Fengping Zhang, Burlington, MA (US); Hong Xiao, Methuen, MA (US); Raymond C. Counterman, Canton, MA (US); Susan Kelly, Maynard, MA (US); Okeno R. Palmer, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/577,057

(22) Filed: Dec. 19, 2014

(65) Prior Publication Data

US 2016/0149923 A1   May 26, 2016

Related U.S. Application Data

(60) Provisional application No. 62/083,762, filed on Nov. 24, 2014.

(51) Int. Cl.
*H04L 9/08* (2006.01)
*H04L 29/06* (2006.01)
*G06Q 20/40* (2012.01)

(52) U.S. Cl.
CPC .............. *H04L 63/101* (2013.01); *G06Q 20/40* (2013.01)

(58) Field of Classification Search
CPC ... H04M 15/00; H04M 3/42; H04M 3/42136; H04M 3/4228; H04M 15/90; H04M 2203/052; H04M 2215/016; H04M 2201/54; H04M 15/08; H04M 15/51; H04M 2215/22; H04M 2215/54; H04M 2215/62; H04M 15/09; H04M 15/41; H04M 15/43; H04M 15/80; H04M 15/56; H04M 2215/0192; H04Q 3/00; H04Q 3/0037; H04Q 3/0029; H04Q 3/0045; H04L 41/08; H04L 41/12; H04L 41/22; H04L 12/2856; H04L 12/2872; H04L 12/28; H04L 12/1475; H04L 12/1446; H04L 12/1435; H04L 12/1439; G06Q 30/00; G06Q 50/10; H04W 4/24
USPC ........... 726/2–7; 709/223–226; 370/252, 312, 370/352, 462; 379/221.08; 342/458
See application file for complete search history.

(56) References Cited

U.S. PATENT DOCUMENTS

| | | | | |
|---|---|---|---|---|
| 6,181,690 | B1 * | 1/2001 | Civanlar | H04L 12/2856 370/352 |
| 6,779,030 | B1 * | 8/2004 | Dugan | H04M 3/42136 379/221.08 |
| 8,166,144 | B2 * | 4/2012 | Siegmund | H04L 41/08 709/223 |
| 8,693,358 | B2 * | 4/2014 | Hodges | G06Q 30/00 370/252 |

OTHER PUBLICATIONS

Krawczyk, et al. "HMAC: Keyed-Hashing for Message Authentication," RFC 2104, https://www.ietf.org/rfc/rfc2104.txt, Feb. 1997, 11 pages.

* cited by examiner

*Primary Examiner* — Thanhnga B Truong

(57) ABSTRACT

A system may receive a network address to be validated to determine whether the network address is associated with a toll-free data service. The system may perform a validation operation to validate that the network address is associated with the toll-free data service. The validation operation may be based on a key identifier associated with the network address or a network address signature associated with the network address. The key identifier may correspond to a security key used to create the network address signature. The network address signature may be created using the security key. The system may determine whether to bill a first party or a second party for data usage associated with the toll-free data service based on the validation operation. The system may provide information that identifies whether to bill the first party or the second party for the data usage associated with the toll-free data service.

20 Claims, 11 Drawing Sheets

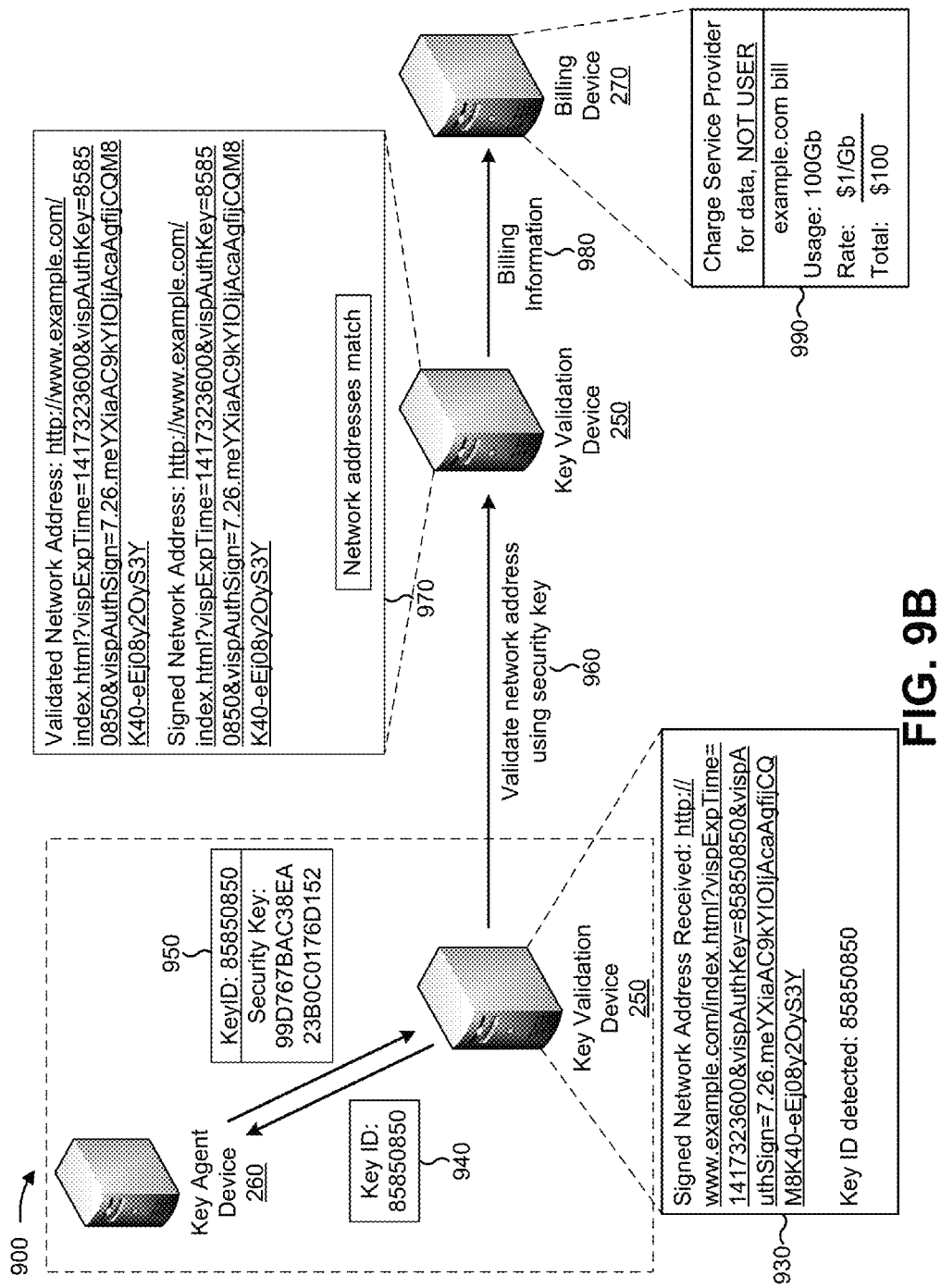

KEY MANAGEMENT SYSTEM FOR TOLL-FREE DATA SERVICE

RELATED APPLICATIONS

This application claims priority under 35 U.S.C. §119 to U.S. Provisional Patent Application No. 62/083,762, filed on Nov. 24, 2014, the content of which is incorporated by reference herein in its entirety.

BACKGROUND

Service providers, such as online media companies, may wish to deliver content to network users. Some service providers may choose to subsidize the cost of network data usage which would otherwise be paid by the network users accessing the content.

BRIEF DESCRIPTION OF THE DRAWINGS

FIGS. 9A and 9B are diagrams of an example implementation relating to the example process shown in FIG. 8.

DETAILED DESCRIPTION OF PREFERRED EMBODIMENTS

The following detailed description of example implementations refers to the accompanying drawings. The same reference numbers in different drawings may identify the same or similar elements.

A service provider may want to provide content to a network user. The service provider may want to subsidize the cost of network data usage which would ordinarily be charged to the network user. A network operator may want a secure method to ensure that network data usage is charged to the appropriate party (e.g., either the service provider or the network user). Implementations described herein may assist the network operator in tracking network data usage for toll-free data services, and may assist the service provider in implementing secure toll-free data services using a key management system.

Figure 1A:
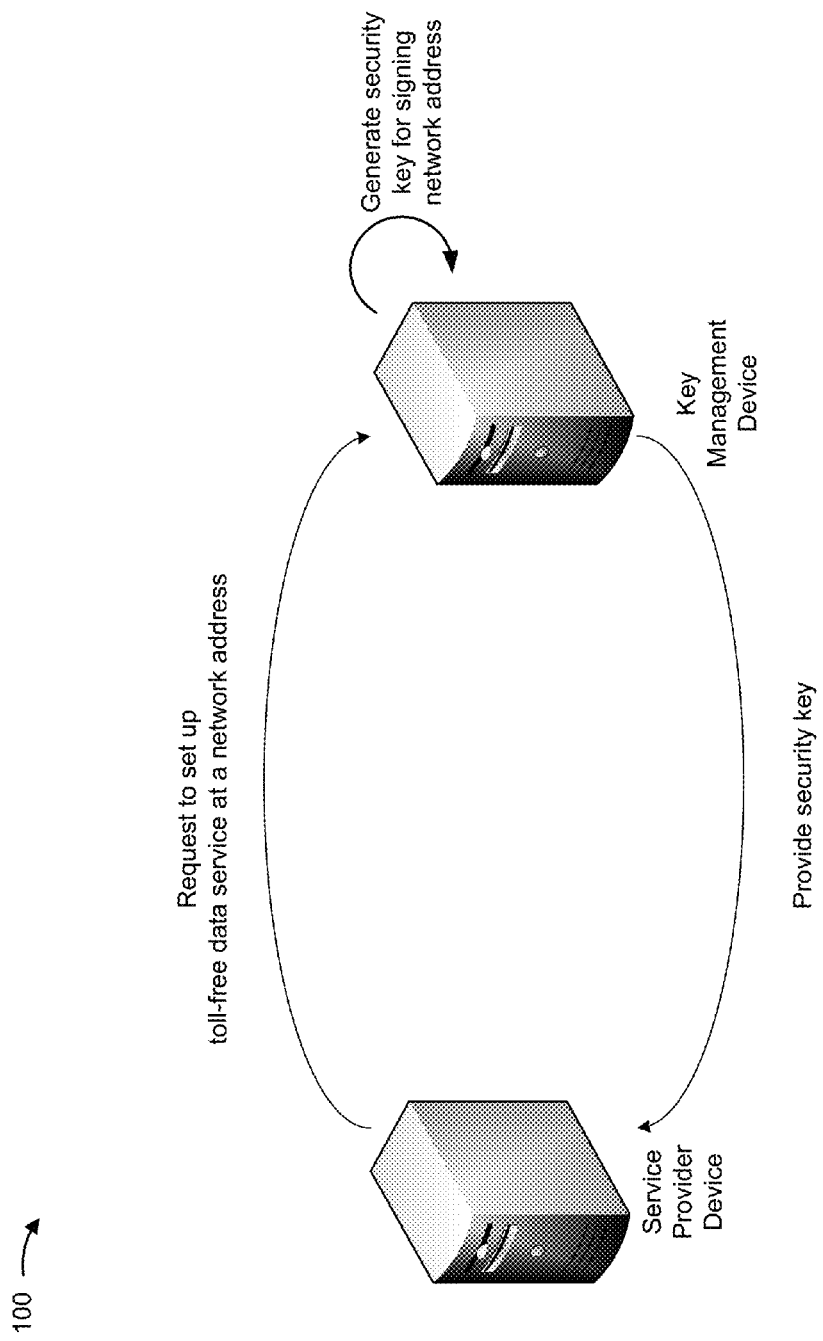
FIGS. 1A and 1B are diagrams of an overview of an example implementation described herein.
Figure 1B:
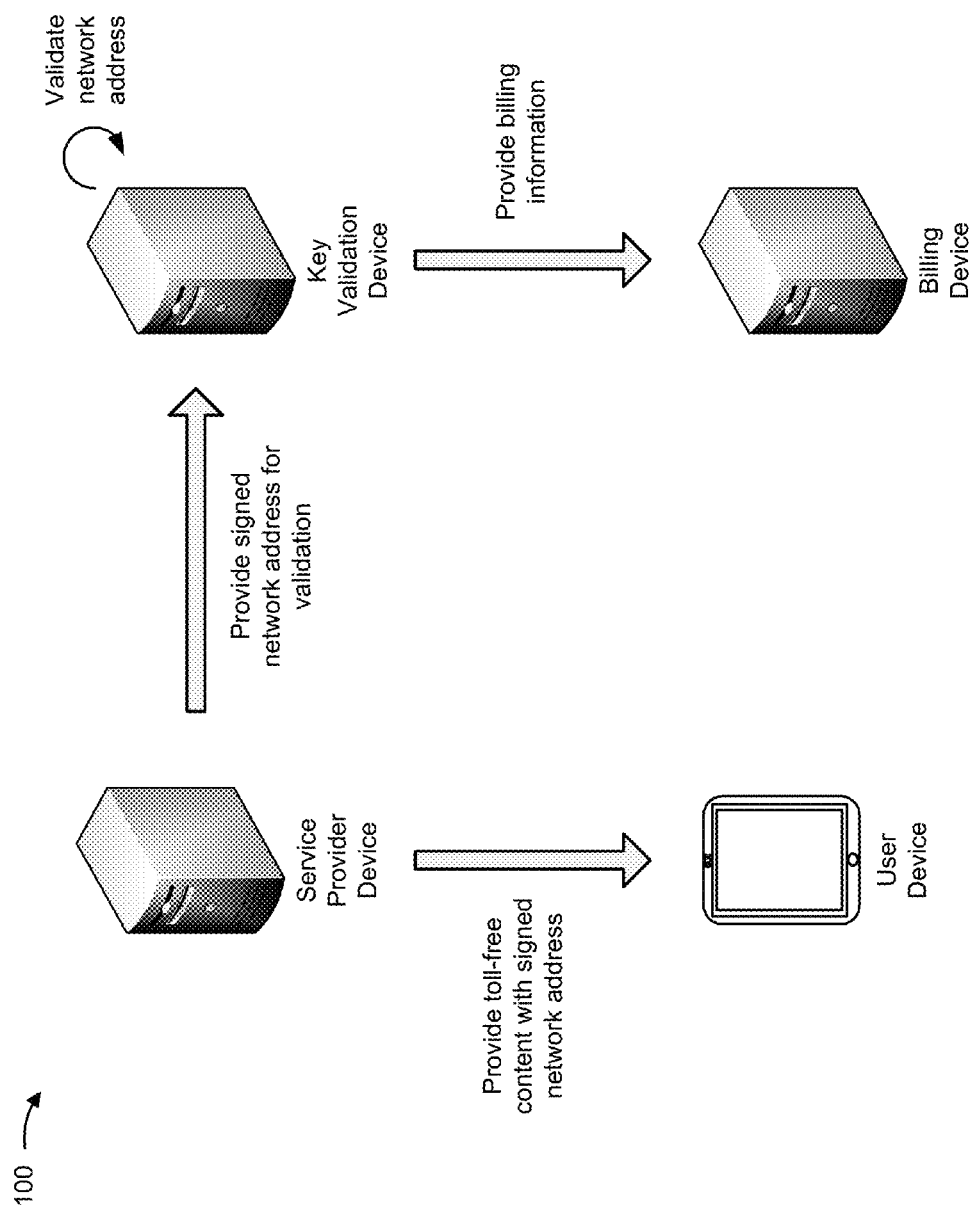

FIGS. 1A and 1B are diagrams of an overview of an example implementation 100 described herein. As shown in FIG. 1A, a service provider device (e.g., a server), associated with a service provider, may request to set up a toll-free data service to be provided with a particular network address (e.g., a uniform resource locator (URL)). A key management device (e.g., a server), associated with a network operator, may receive the request to set up the toll-free data service, and may associate the request with a security key. In some cases, an authorization device may receive the request to set up the toll-free service, and may request the security key from the key management device. The authorization device may sign the particular network address, and may provide the signed network address to the service provider device. In other cases, the key management device may provide the security key to the service provider device, so the service provider device (rather than the authorization device) may sign the network address using the security key.

For the purpose of FIG. 1B, assume that a user interacts with a user device (e.g., a mobile phone) to access content from the service provider device via the network address associated with the toll-free data service. The service provider device may provide content with a signed network address that indicates that data accessed via the signed network address is to be subsidized by the service provider as a toll-free data service. A key validation device (e.g., a server), may receive and validate the signed network address to ensure that data accessed via the signed network address is subsidized by the service provider. The key validation device may record or provide billing information to ensure that the service provider and/or the user is properly charged for the data. In this way, the service provider may use the key management system to arrange a toll-free data service, and the network operator may validate the toll-free data service to permit a correct party to be charged for the toll-free data service.

Figure 2:
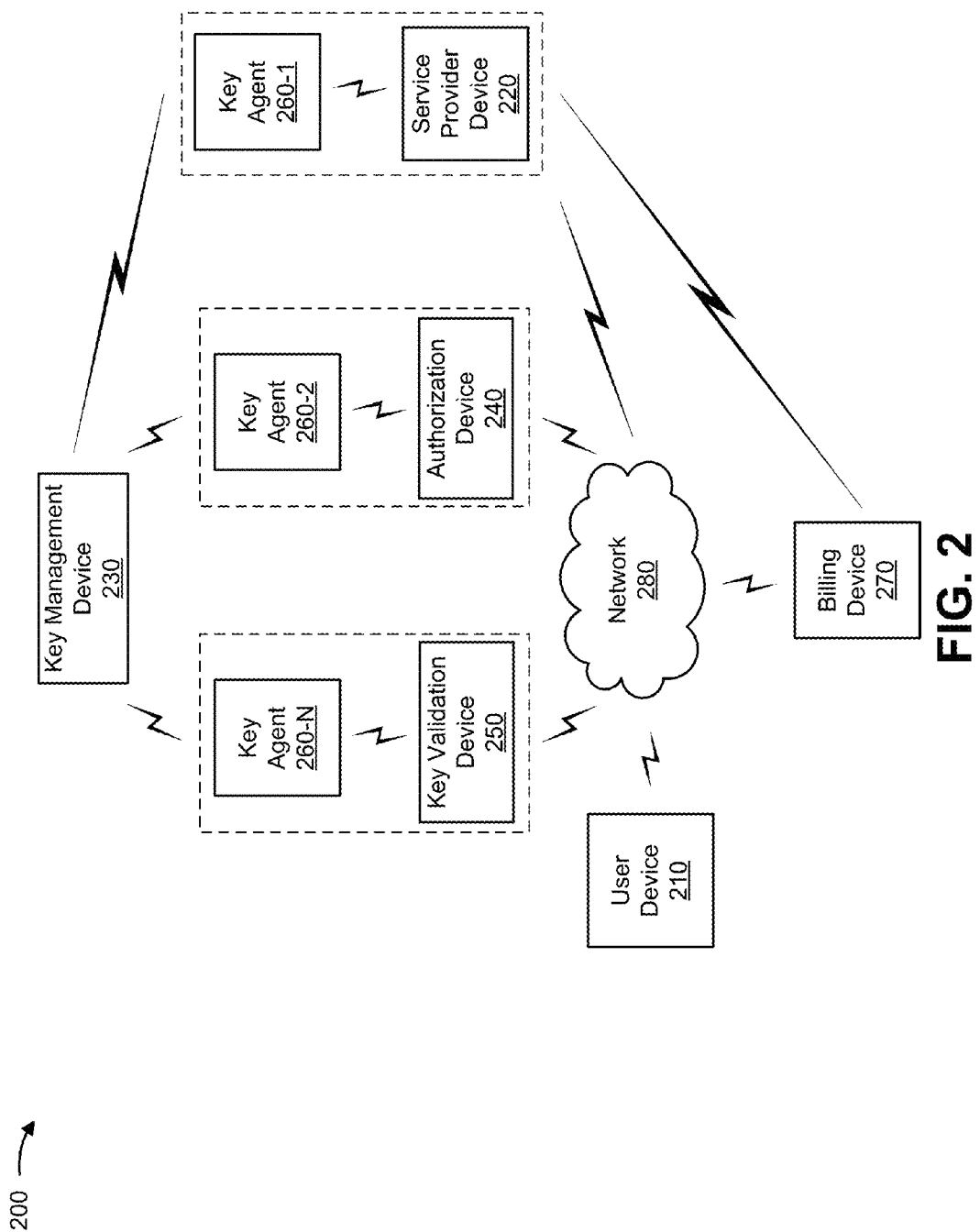
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a service provider device 220, a key management device 230, an authorization device 240, a key validation device 250, a set of key agents 260-1 to 260-N (hereinafter referred to collectively as "key agents 260," and individually as "key agent 260"), a billing device 270, and a network 280. Devices of environment 200 may interconnect via wired connections, wireless connections, or a combination of wired and wireless connections.

User device 210 may include a device capable of connecting to a network and/or capable of accessing content over a network (e.g., network 280). For example, user device 210 may include a computing device, such as a mobile phone, a desktop computer, a laptop computer, a tablet computer, a handheld computer, a set top box, a gaming device, or a similar device. In some implementations, user device 210 may include a communication interface that allows user device 210 to receive information from and/or transmit information to service provider device 220. User device 210 may be used to access a toll-free data service, such as toll-free content, provided by service provider device 220.

Service provider device 220 may include one or more devices capable of receiving, generating, storing, processing, and/or providing information associated with a toll-free data service. For example, service provider device 220 may include a computing device, such as a server (e.g., a content server, a web server, an application server, etc.) or a similar device. In some implementations, service provider device 220 may interact with key management device 230 and/or key validation device 250 to determine a signed network address for providing a toll-free data service. Additionally, or alternatively, service provider device 220 may provide a toll-free data service to user device 210 via the signed network address. In some implementations, service provider device 220 may be associated with key agent 260.

Key management device 230 may include one or more devices capable of generating, storing, processing, deleting, and/or providing a security key and/or information associated with a security key. For example, key management device 230 may include a computing device, such as a server or a similar device. In some implementations, key management device 230 may generate, store, and/or provide a security key to sign a network address, and to secure a toll-free data service. Additionally, or alternatively, key management device 230 may manage security keys (e.g., by adding security keys, revoking security keys, rotating security keys, etc.). In some implementations, key management device 230 may provide a security key and/or information associated with a security key to a device, such as service provider device 220, authorization device 240, key validation device 250, and/or key agent 260. In some implementations, key management device 230 may manage session time records. A session time record may refer to a record relating to one or more time periods during which user device 210 and/or service provider device 220 provided and/or accessed toll-free data services.

Authorization device 240 may include one or more devices capable of performing authorization operations for communication sessions associated with a toll-free data service. For example, authorization device 240 may include a computing device, such as a server, or a similar device. In some implementations, authorization device 240 may perform authorization operations for service provider device 220 (e.g., using one or more credentials), may generate a signed network address using a security key associated with service provider device 220, may store information related to service provider device 220 and/or the toll-free data service, and/or may perform similar operations. In some implementations, authorization device 240 may be associated with key agent 260.

Key validation device 250 may include one or more devices capable of validating a signed network address associated with a toll-free data service, and/or capable of receiving, storing, processing, and/or providing information related to the validation of a signed network address. For example, key validation device 250 may include a computing device, such as a server (e.g., a web server, a database server, etc.), or a similar device. In some implementations, key validation device 250 may manage billing information for a toll-free data service. Additionally, or alternatively, key validation device 250 may provide billing information to billing device 270, associated with a network operator, to permit the network operator to bill an appropriate party for a toll-free data service. Additionally, or alternatively, key validation device 250 may manage session time records. In some implementations, key validation device 250 may include a network processing unit (NPU) (e.g., a device capable of validating a signed network address). In some implementations, the NPU may be separate from key validation device 250. In some implementations, key validation device 250 may be associated with key agent 260.

Billing device 270 may include one or more devices capable of managing billing information and/or session time record information for a toll-free data service. For example, billing device 270 may include a computing device, such as a server (e.g., a web server, a database server, etc.), or a similar device associated with a network operator (e.g., a network operator of network 280). In some implementations, billing device 270 may be capable of billing user device 210 and/or service provider device 220 for activities related to a toll-free data service.

Network 280 may include one or more wired and/or wireless networks. For example, network 280 may include a cellular network (e.g., a code division multiple access (CDMA) network, a long term evolution (LTE) network, etc.), a public land mobile network (PLMN), a local area network (LAN), a wide area network (WAN), a metropolitan area network (MAN), a telephone network (e.g., the Public Switched Telephone Network (PSTN)), a near field communication (NFC) network, an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
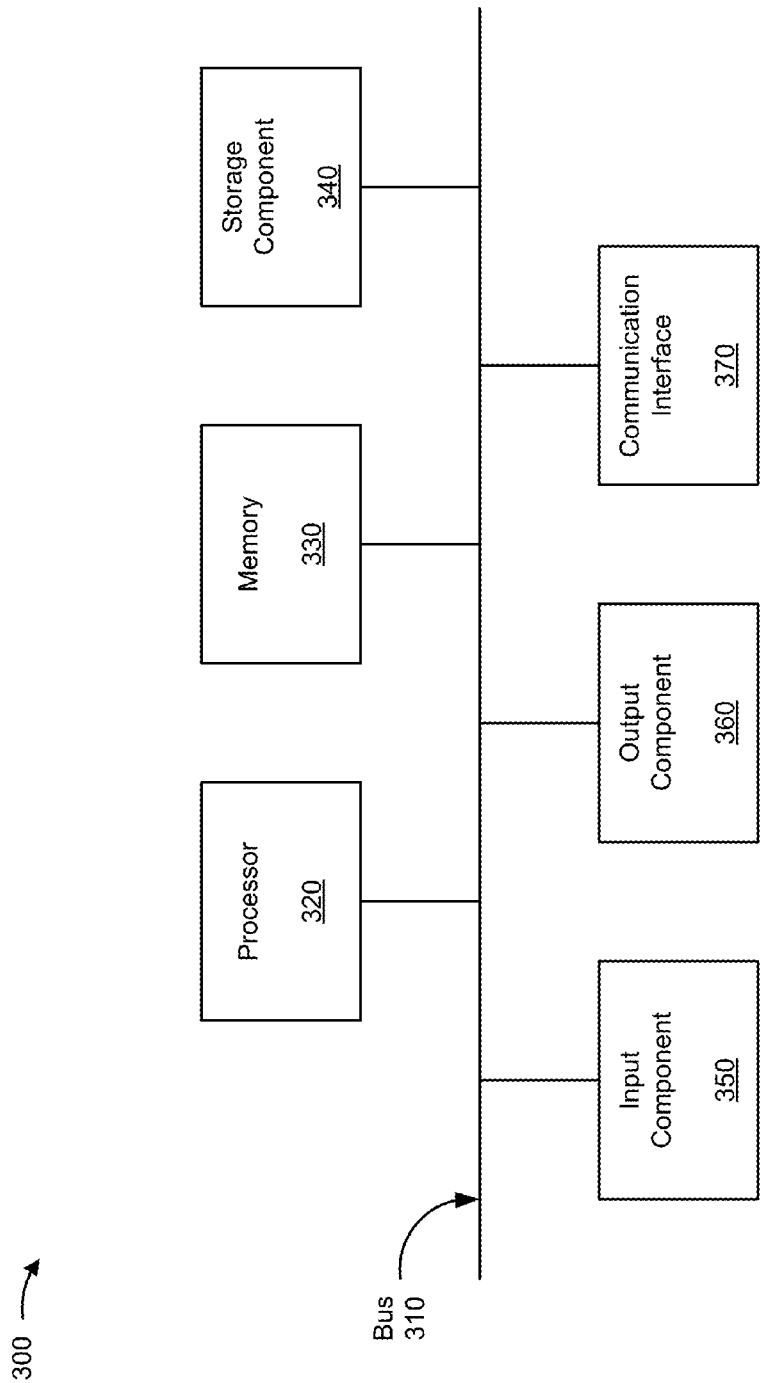
FIG. 3 is a diagram of example components of one or more devices of FIG. 2.

FIG. 3 is a diagram of example components of a device 300. Device 300 may correspond to user device 210, service provider device 220, key management device 230, authorization device 240, key validation device 250, key agent 260, and/or billing device 270. In some implementations, user device 210, service provider device 220, key management device 230, authorization device 240, key validation device 250, key agent 260, and/or billing device 270 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
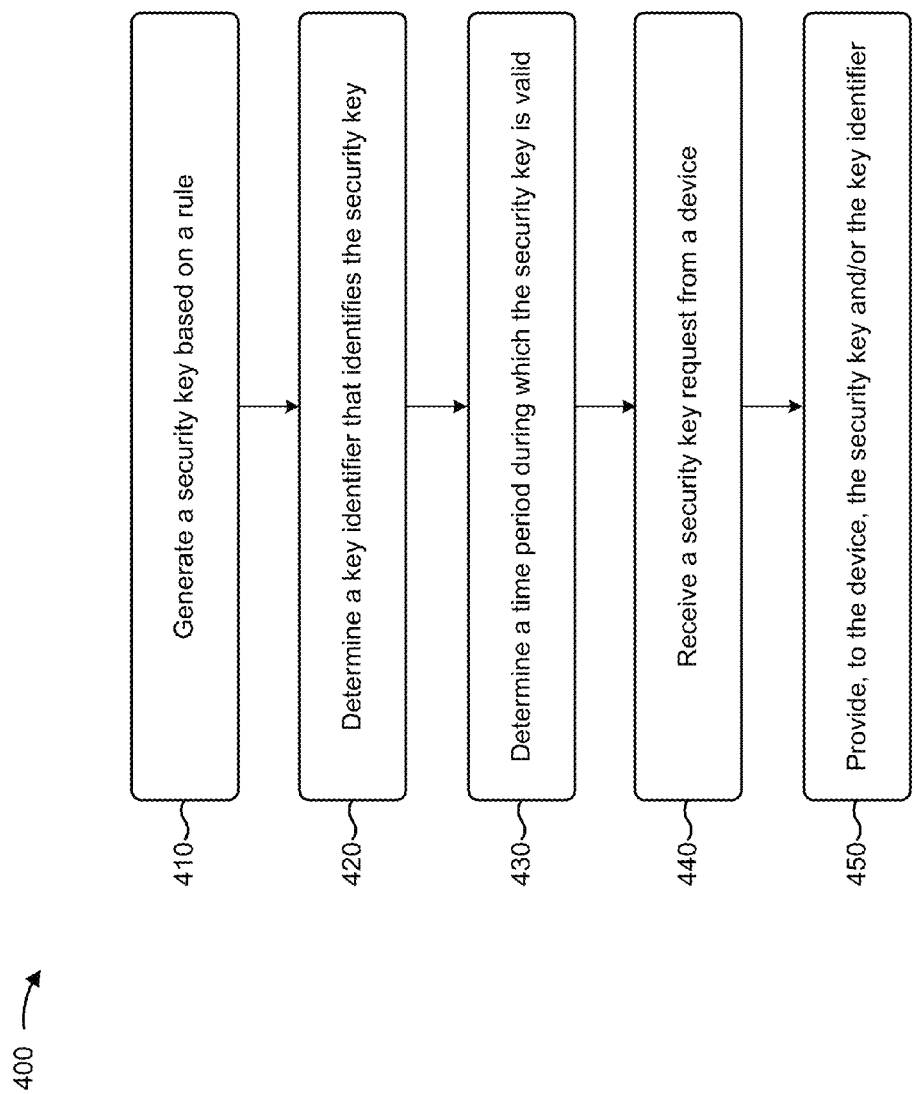
FIG. 4 is a flow chart of an example process for creating, distributing, and/or storing a security key for a toll-free data service.

FIG. 4 is a flow chart of an example process 400 for creating, distributing, and/or storing a security key for a toll-free data service. In some implementations, one or more process blocks of FIG. 4 may be performed by key management device 230. Additionally, or alternatively, one or more process blocks of FIG. 4 may be performed by another device or group of devices separate from or including key management device 230, such as service provider device 220, authorization device 240, key validation device 250, and/or key agent 260.

As shown in FIG. 4, process 400 may include generating a security key based on a rule (block 410). For example, key management device 230 may generate a security key based on a rule. In some implementations, key management device 230 may generate one or more security keys without receiving a request for a security key. For example, key management device 230 may generate one or more security keys if the number of security keys stored by key management device 230 satisfies a threshold. By storing and generating security keys before receiving a request, key management device 230 may more quickly transmit a stored security key in response to a request from service provider device 220.

In some implementations, key management device 230 may generate one or more security keys to replace one or more of the stored security keys that have been stored for a threshold amount of time. By generating security keys to replace security keys that have been stored for a threshold amount of time, key management device 230 may improve the security of the key management system (e.g., by replacing old security keys). In some implementations, key management device 230 may determine, upon startup, if one or more security keys are present in local storage. Based on this determination, key management device 230 may generate one or more security keys.

The security key may include an object key, a validation key, and/or a token key. An object key may be a type of security key used by service provider device 220 to sign a network address associated with toll-free content (e.g., an embedded object that provides access to toll-free content, such as streaming video, audio, or similar content embedded in a webpage, an application, or the like). A validation key may be a type of security key used by authorization device 240 to sign a network address associated with toll-free content. In other words, authorization device 240 or service provider device 220 may sign a network address using the security key, as described in more detail elsewhere herein. A token key may be a type of key used by authorization device 240 to encrypt a token message (e.g., a mobile directory number (MDN), an authorization device identifier that identifies authorization device 240, or the like) and/or one or more credentials, and/or used by key validation device 250 to decrypt a token message and/or one or more credentials. The type of the security key (i.e., object key, token key, and/or validation key) may be indicated by key management device 230 (e.g., in a data structure, with a first identifier corresponding to an object key, a second identifier corresponding to a validation key, a third identifier corresponding to a token key, or the like).

In some implementations, key management device 230 may generate a security key based on a request for a security key. For example, a service provider, associated with service provider device 220, may desire to subsidize data usage costs incurred when user device 210 is accessing content associated with service provider device 220. The service provider may input, to service provider device 220, information associated with a toll-free data service, and may instruct service provider device 220 to transmit a request associated with the toll-free data service to key management device 230. Service provider device 220 may transmit the request as a request for a security key associated with the toll-free data service. The request may include, for example, a credential (e.g., a personal identification number, a customer identification number, an application identification number, a username, a keyword, a password, an answer to a challenge question, an application secret, or the like) to permit key management device 230 to authenticate service provider device 220; a key name; or the like. Key management device 230 may generate a security key based on the credential and/or the key name associated with the request.

In some implementations, key management device 230 may receive a request for a security key from service provider device 220. Service provider device 220 may request the security key by providing a service provider identifier that identifies a service provider associated with the toll-free data service. In some implementations, service provider device 220 may transmit a key name to key management device 230. Key management device 230 may receive the key name. The key name may include a string of characters of any length. The key name may be chosen by a service provider, and may assist the service provider in recognizing the key. In some implementations, the key name may be distinct from the key identifier. In some implementations, the key name may match the key identifier.

In some implementations, key management device 230 may receive, from service provider device 220, a request for a replacement security key to replace a lost or forgotten security key. The request for the replacement security key may include one or more credentials of service provider device 220 and/or a key name. Key management device 230 may authenticate the one or more credentials and/or the key name provided by service provider device 220, and may issue the replacement security key to replace the lost or stolen security key. Additionally, or alternatively, key management device 230 may receive a request to revoke an existing security key. Key management device 230 may authenticate one or more credentials of service provider device 220, and may revoke the existing security key. In some implementations, key management device 230 may store and/or transmit an indication that the existing security key has been revoked.

As further shown in FIG. 4, process 400 may include determining a key identifier that identifies the security key (block 420). For example, key management device 230 may determine a key identifier to identify the generated security key, and may associate the generated security key with the key identifier. The key identifier may include a string of characters of any length. The key identifier may include an identifying characteristic (e.g., a particular character, a predetermined character, or the like), to assist authorization device 240 and/or key validation device 250 in identifying the key identifier. The key identifier may be generated by key management device 230.

As further shown in FIG. 4, process 400 may include determining a time period during which the security key is valid (block 430). For example, key management device 230 may determine a start time and/or an end time, which define the time period. In some implementations, key management device 230 may determine a time before which the security key is not valid. In this way, the network provider may ensure that the security key does not become valid before key management device 230 has provided and/or stored the security key.

In some implementations, the start time and/or the end time may be defined in the request from service provider device 220. Additionally, or alternatively, key management device 230 may assign a default time period for a security key to remain valid (e.g., one week after generation, one day after generation, in perpetuity, or some other time period). Additionally, or alternatively, key management device 230 may assign a recurring time period for the security key to be valid (e.g., every Monday, the tenth through twentieth of each month, or some other time period).

As further shown in FIG. 4, process 400 may include receiving a security key request from a device (block 440). For example, key management device 230 may receive, from key agent 260, a security key request. The security key request may include a last request identifier, identifying a time at which a preceding security key request was transmitted. Key management device 230 may determine one or more security keys to provide to key agent 260, based on the security key request and the last request identifier. In some implementations, key management device 230 may receive a security key request from service provider device 220. Key management device 230 may generate a security key based on the security key request, as described in more detail elsewhere herein.

In some implementations, key management device 230 may receive a security key request from a device other than service provider device 220 and/or key agent 260. For example, key management device 230 may receive a security key request from authorization device 240, requesting a security key to be used to sign a network address associated with a toll-free data service and/or to encrypt a message. Additionally, or alternatively, key management device 230 may receive a security key request from key validation device 250, requesting a security key to be used to validate a signed network address and/or to decrypt a message.

As further shown in FIG. 4, process 400 may include providing, to the device, the security key and/or the key identifier (block 450). For example, key management device 230 may provide the security key and/or the key identifier to key agent 260 based on the security key request. In some implementations, key management device 230 may determine one or more security keys to provide to key agent 260 based on the last request identifier (e.g., key management device 230 may provide a security key generated after a time indicated by the last request identifier). In some implementations, key management device 230 may determine one or more invalid security keys (e.g., one or more security keys that are expired, lost, stolen, revoked, or the like). Key management device 230 may provide, to key agent 260, information that identifies the one or more invalid security keys.

In some implementations, key management device 230 may provide the security key and/or the key identifier to key validation device 250. Key validation device 250 may use this information for a validation operation, as described in more detail in connection with FIG. 6. In some implementations, key management device 230 may provide the security key and/or the key identifier to authorization device 240. Authorization device 240 may use the security key to sign the network address, based on a rule or policy that determines a party to charge, as described in more detail in connection with FIG. 8.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
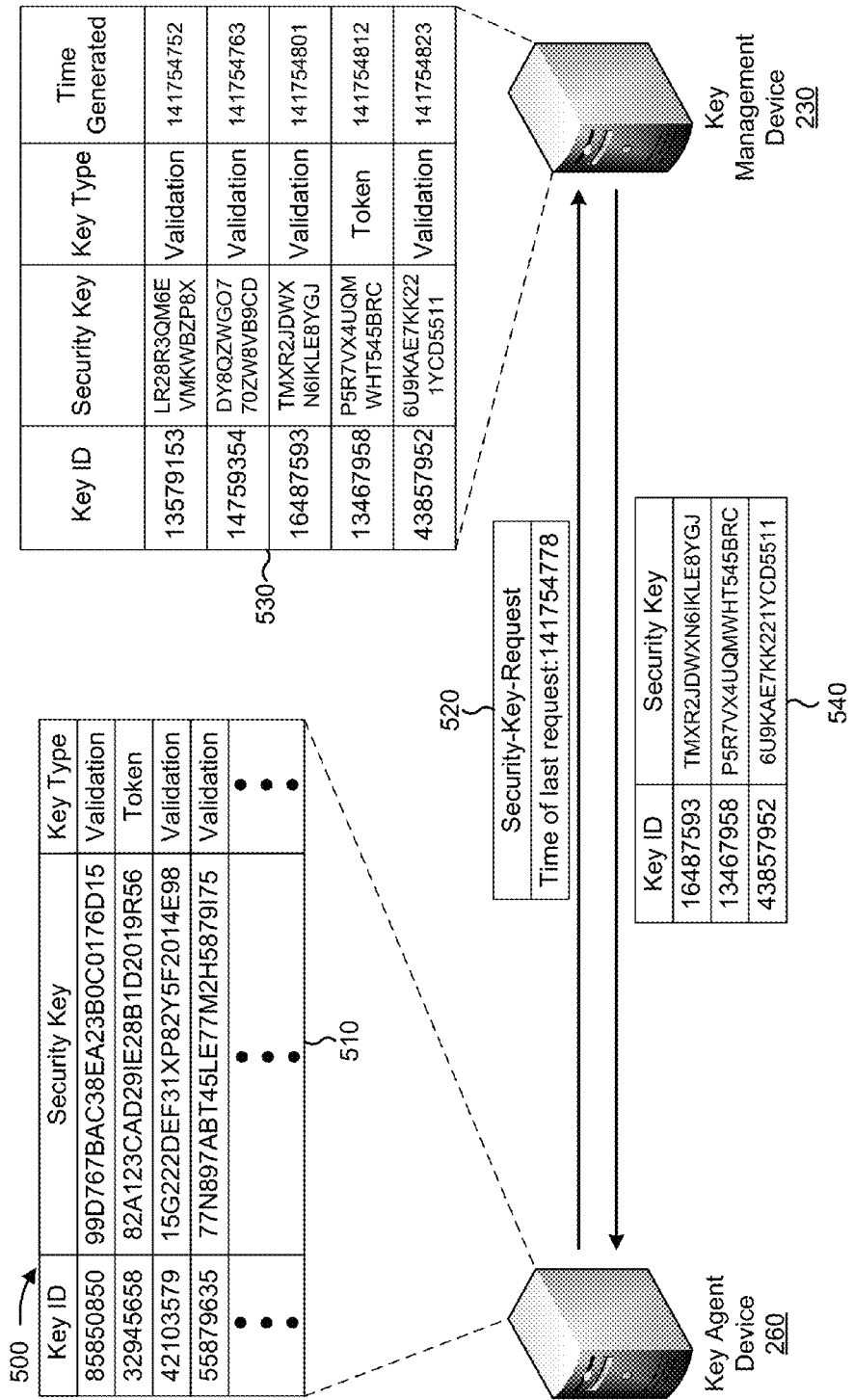
FIG. 5 is a diagram of an example implementation relating to the example process shown in FIG. 4.

FIG. 5 is a diagram of an example implementation 500 relating to example process 400 shown in FIG. 4. As shown by example implementation 500, a service provider may use an input device to request a security key associated with a toll-free data service.

For the purpose of FIG. 5, assume that key agent 260 has previously received a first set of multiple, different security keys from key management device 230. Assume further that each security key in the first set is associated with a key identifier and a key type. Assume that key management device 230 has generated a second set of multiple, different security keys since providing the first set of multiple, different security keys to key agent 260.

As shown in FIG. 5, and by reference number 510, key agent 260 may store one or more security keys, associated with one or more key identifiers and one or more key types (here, the security key 99D767BAC38EA23B0C0176D152 is associated with the key identifier 85850850 and the validation key type, and so on). As shown by reference number 520, key agent 260 may transmit a security key request (here, Security-Key-Request) to key management device 230. As further shown, the security key request may include a last request identifier (here, "time of last request"), identifying a time associated with a previous security key request (here, 1417547778). Assume that key management device 230 receives the security key request.

As shown by reference number 530, key management device 230 may store one or more security keys. As further shown, each security key may be identified by a key identifier, and may be associated with a key type and a time of generation (e.g., a time when key management device 230 generated the security key). For example, here, the security key LR28R3QM6EVMKWBZP8XQ is associated with a key identifier of 13579153, the validation key type, and a time of generation of 14754752.

Assume that key management device 230 selects one or more security keys that were generated after the time indicated by the last request identifier to provide to key agent 260 (here, the security keys indicated by the key identifiers 16487593, 13467958, and 43857952). As shown by reference number 540, key management device 230 may provide, to key agent 260, the one or more security keys.

As indicated above, FIG. 5 is provided merely as an example. Other examples are possible and may differ from what was described with regard to FIG. 5.

Figure 6:
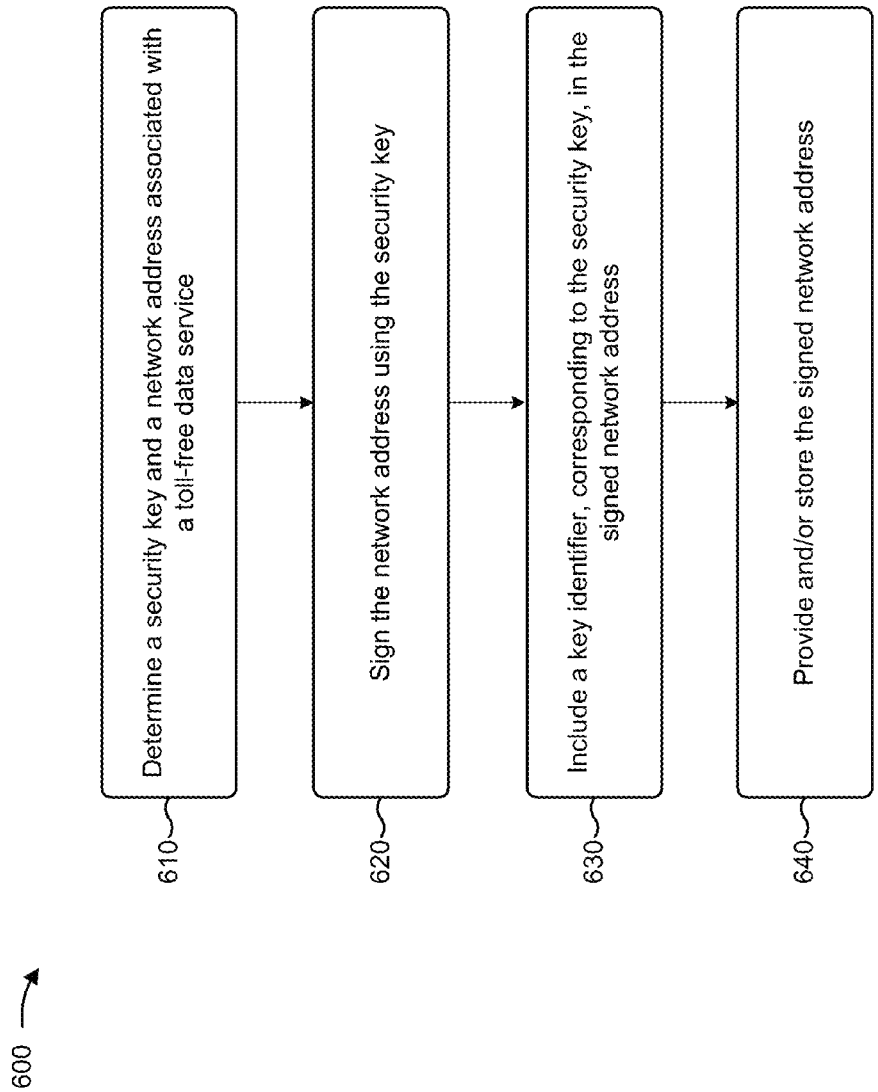
FIG. 6 is a flow chart of an example process for providing and/or storing a signed network address associated with a toll-free data service.

FIG. 6 is a flow chart of an example process for providing and/or storing a signed network address associated with a toll-free data service. In some implementations, one or more process blocks of FIG. 6 may be performed by authorization device 240. Additionally, or alternatively, one or more process blocks of FIG. 6 may be performed by another device or a group of devices separate from or including authorization device 240, such as service provider device 220, key validation device 250, and/or key agent 260.

As shown in FIG. 6, process 600 may include determining a security key and a network address associated with a toll-free data service (block 610). For example, authorization device 240 may receive a network address and a service provider identifier from service provider device 220. Authorization device 240 may determine, based on locally stored information, that the network address and the service provider identifier are associated with a toll-free data service. In some implementations, authorization device 240 may determine a key identifier associated with the service provider identifier, based on the locally stored information. Authorization device 240 may provide the key identifier to key agent 260 to determine a security key associated with the key identifier. In some implementations, authorization device 240 may receive the security key, associated with the key identifier, from key agent 260.

Authorization device 240 may locally store information associating a toll-free data service, a network address, and a service provider identifier. In some implementations, service provider device 220 may provide the information to authorization device 240 for local storage. In some implementations, another device, such as key management device 230, may provide the information to authorization device 240 for local storage. Additionally, or alternatively, the network operator may provide the locally stored information to authorization device 240 via an input device.

As further shown in FIG. 6, process 600 may include signing the network address using the security key (block 620). For example, authorization device 240 may sign the network address using the security key. For example, authorization device 240 may associate a message (e.g., an expiration time, a segment of the network address, one or more credentials of service provider device 220, an identifier associated with the toll-free data service, or the like) with the network address. Authorization device 240 may apply a digital signature algorithm (e.g., an advanced encryption standard (AES) algorithm, a keyed-hash message authentication code (HMAC) algorithm, or the like) to the message and the security key to create a digital signature. In some implementations, service provider device 220 may use the digital signature to sign the network address. Additionally, or alternatively, another device (e.g., key management device 230, key validation device 250, etc.) may use the digital signature to sign the network address using the security key.

In some implementations, a first type of security key (e.g., an object key), and a second type of security key (e.g., a validation key), may be signed using the same digital signature algorithm (e.g., an HMAC algorithm). Additionally, or alternatively, a third type of security key (e.g., a token key) may be signed using a different digital signature algorithm (e.g., an AES algorithm) than the first type and the second type of security key.

In some implementations, authorization device 240 may encrypt information using the security key. For example, assume that authorization device 240 receives a validation request from user device 210, including a network address (e.g., a mobile directory number (MDN)), a credential (e.g., a service identifier, identifying the device associated with the network address as a device associated with the validation request), and/or a message. Assume further that authorization device 240 stores information associating user device 210 with a token key (e.g., information that associates user device 210 with a key identifier that identifies a token key). Authorization device 240 may determine, based on the stored information, the token key associated with user device 210. Authorization device 240 may encrypt the message, the network address, and/or the credential, using a security key and an encryption algorithm (e.g., an advanced encryption standard (AES) algorithm). Authorization device 240 may provide the encrypted message, network address, and credential to user device 210 and/or key validation device 250.

As further shown in FIG. 6, process 600 may include including a key identifier, corresponding to the security key, in the signed network address (block 630). For example, authorization device 240 may determine a key identifier corresponding to the security key used to sign the network address. In some implementations, authorization device 240 may determine the key identifier corresponding to the security key by a memory lookup operation. In some implementations, authorization device 240 may include (e.g., by inserting, appending, prepending, concatenating, or the like) the key identifier in the signed network address.

While authorization device 240 is described above as including the key identifier in the signed network address, in some implementations, service provider device 220 may include the key identifier in the signed network address. For example, when service provider device 220 has requested an object key and signed the network address using the object key, service provider device 220 may include the key identifier in the signed network address.

As further shown in FIG. 6, process 600 may include providing and/or storing the signed network address (block 640). For example, authorization device 240 may provide the signed network address, including the key identifier, to service provider device 220. In some implementations, service provider device 220 may store the network address after signing the network address using the security key and/or after including the key identifier. In this way, service provider device 220 may provide toll-free content to user device 210 using the signed network address.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
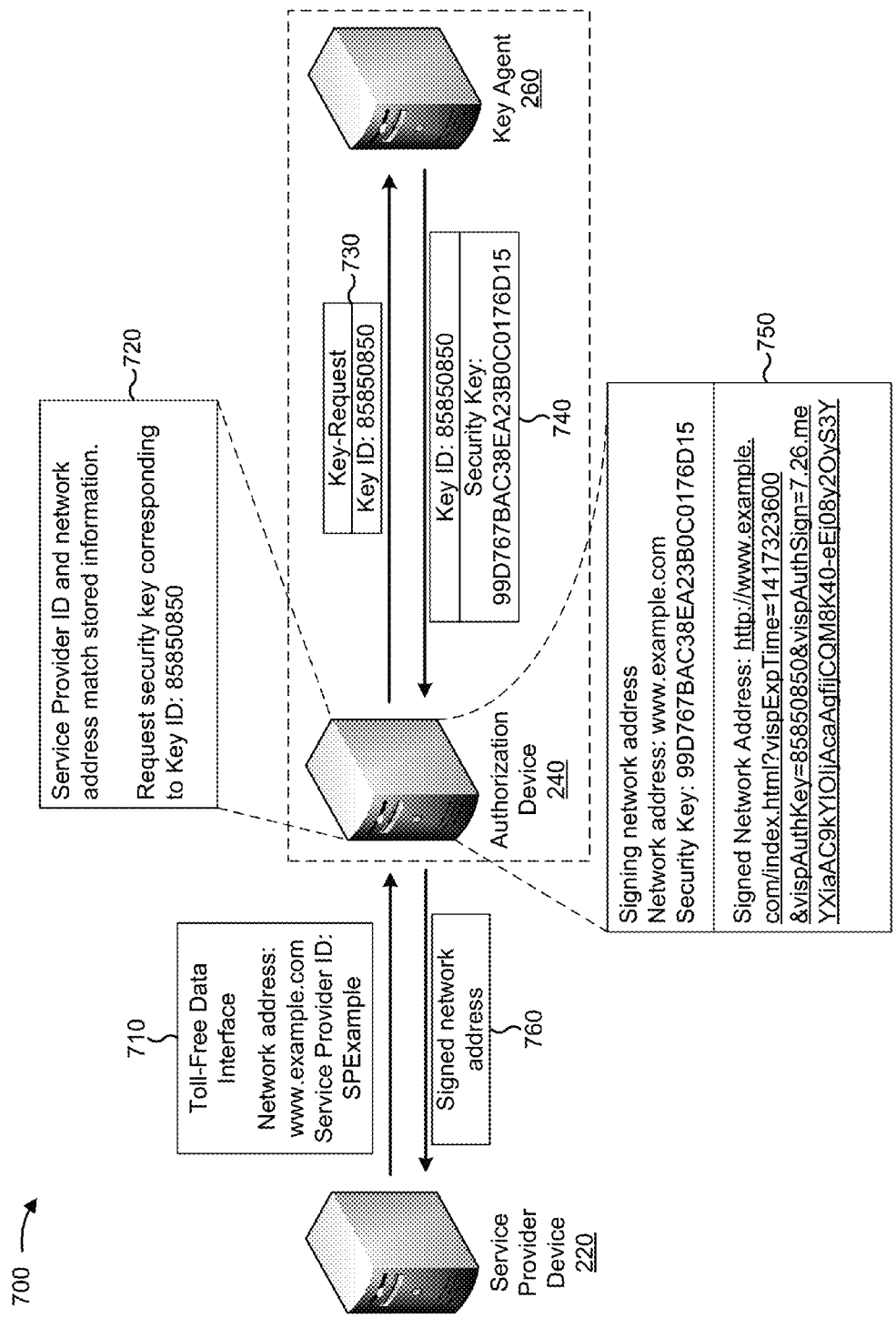
FIG. 7 is a diagram of an example implementation relating to the example process shown in FIG. 6.

FIG. 7 is a diagram of an example implementation 700 relating to example process 600 shown in FIG. 6. As shown by example implementation 700, authorization device 240 may receive a network address from service provider device 220, may sign the network address, and may provide the signed network address to service provider device 220. For the purpose of FIG. 7, assume that the operations described herein in connection with FIG. 5 have been performed.

For the purpose of FIG. 7, assume that service provider device 220 has requested, from authorization device 240, a security key to implement a toll-free data service. Assume further that service provider device 220 requested, from authorization device 240, a validation key to sign a webpage, and provided a network address and a service provider identifier to be associated with the request. Assume that authorization device 240 stored the service provider identifier and the network address associated with the toll-free data service. Assume that key management device 230 previously generated a validation key and a key identifier, and has provided the validation key and the key identifier to key agent 260, as shown in FIG. 5. Assume further that authorization device 240 received the key identifier from key management device 230, and associated the key identifier and the toll-free data service.

As shown in FIG. 7, and by reference number 710, service provider device 220 may provide, to authorization device 240, a network address and a service provider identifier (here, www.example.com and SPExample) associated with the toll-free data service. As shown by reference number 720, authorization device 240 may receive the network address and the service provider identifier. As shown, authorization device 240 may determine that the service provider identifier and the network address match locally stored information. Assume that authorization device 240 determines, based on the locally stored information, that the service provider identifier and the network address are associated with the toll-free data service. Assume further that authorization device 240 determines the key identifier associated with the toll-free data service (here, the key identifier is 85850850). As shown by reference number 730, authorization device 240 may provide a security key request to key agent 260 (here, Key-Request), requesting a security key associated with the key identifier of 85850850).

As shown by reference number 740, authorization device 240 may receive the security key associated with the key identifier of 85850850 from key agent 260. As shown by reference number 750, authorization device 240 may sign the network address using the security key. As shown, authorization device 240 may include the key identifier with the network address (here, as "VispAuthKey=85850850"). As shown by reference number 760, authorization device 240 may provide the signed network address to service provider device 220.

As indicated above, FIG. 7 is provided merely as an example. Other examples are possible and may differ from what was described with regard to FIG. 7.

Figure 8:
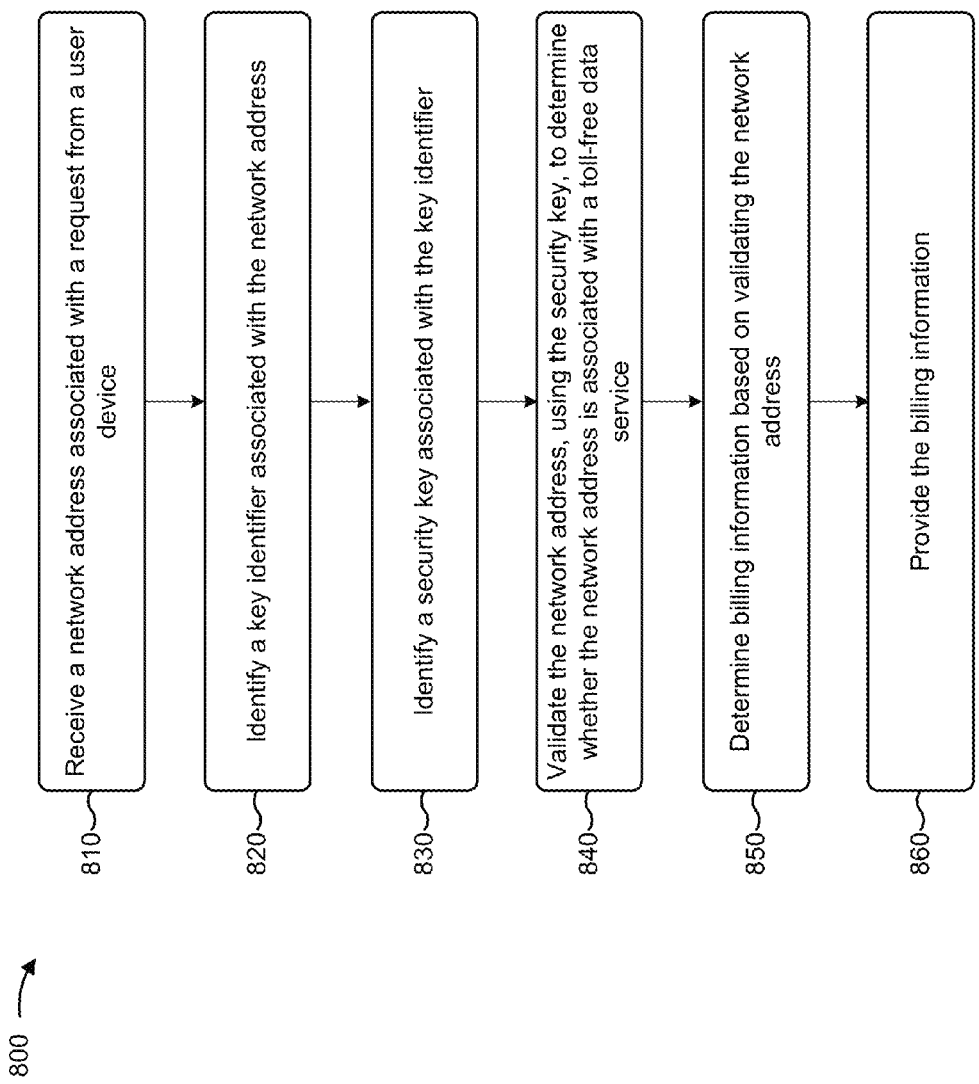
FIG. 8 is a flow chart of an example process for validating a network address for accessing a toll-free data service.

FIG. 8 is a flow chart of an example process 800 for validating a network address for accessing a toll-free data service. In some implementations, one or more process blocks of FIG. 8 may be performed by key validation device 250. Additionally, or alternatively, one or more process blocks of FIG. 8 may be performed by another device or a group of devices separate from or including key validation device 250, such as service provider device 220, key management device 230, authorization device 240, key agent 260, and/or billing device 270.

As shown in FIG. 8, process 800 may include receiving a network address associated with a request from a user device (block 810). For example, user device 210 may request content associated with a toll-free data service provided via service provider device 220. Service provider device 220 may transmit a signed network address, with an included key identifier, to user device 210. In some implementations, service provider device 220 may also transmit the signed network address and included key identifier, with a message (e.g., an expiration time, one or more credentials of service provider device 220, an identifier associated with the toll-free data service, or the like), to key validation device 250. Additionally, or alternatively, key validation device 250 may be configured to receive all signed network addresses transmitted to user device 210. Key validation device 250 may receive the signed network address, the key identifier, and/or the message.

In some implementations, key validation device 250 may receive an encrypted message associated with user device 210. The encrypted message may include a network address (e.g., a mobile directory number (MDN), or the like), a message (e.g., an expiration time, an identifier associated with the toll-free data service, or the like), and/or a credential.

As further shown in FIG. 8, process 800 may include identifying a key identifier associated with the network address (block 820). For example, key validation device 250 may parse the network address for the key identifier, which may be identified by a label (e.g., "vispAuthKey="). In some implementations, key validation device 250 may detect a characteristic of the key identifier to identify the key identifier. For example, the key identifier may include an identifying characteristic (e.g., a particular character, a predetermined character, or the like), which key validation device 250 is configured to detect. Key validation device 250 may detect the characteristic to identify the key identifier. If the key identifier is not identified, key validation device 250 may determine that the network address is not valid, and may charge user device 210 and/or a user associated with user device 210 for data accessed via the network address.

As further shown in FIG. 8, process 800 may include identifying a security key associated with the key identifier (block 830). For example, key validation device 250 may store a list of key identifiers and associated security keys. Key validation device 250 may use the stored list to identify a security key associated with the key identifier. In this way, key validation device 250 may identify the security key without communicating with key management device 230, thereby conserving network resources.

Additionally, or alternatively, key agent 260, associated with key validation device 250, may store the list of security keys associated with key identifiers. Key validation device 250 may request the security key associated with the key identifier from key agent 260. In this way, key validation device 250 may reduce the amount of data that key validation device 250 is required to store locally, thereby conserving resources of key validation device 250.

In some implementations, key management device 230 may store a list of security keys and associated key identifiers. Key validation device 250 may request the security key associated with the key identifier from key management device 230. In this way, the network operator may reduce a quantity of devices required to operate the network.

In some implementations, key validation device 250 may identify a token key. For example, key validation device 250 may receive an encrypted message from user device 210 and/or authorization device 240, as described elsewhere herein in connection with block 810. The encrypted message may be associated with the token key. The encrypted message may include a network address (e.g., an MDN), a token message, and/or one or more credentials. Key validation device 250 may use the one or more credentials to request, from key agent 260, the token key and an associated key identifier. Key validation device 250 may receive the token key and the associated key identifier from key management device 230.

In some implementations, key validation device 250 may use the token key to decrypt the token message and the network address, which were included in the request. For example, key validation device 250 may apply an advanced encryption standard (AES) algorithm to the token message and the network address, to decrypt the token message and the network address based on the token key. In this way, authorization device 240 and key validation device 250 may use the token key to securely encrypt and transmit the token message via network 280.

As further shown in FIG. 8, process 800 may include validating the network address, using the security key, to determine whether the network address is associated with a toll-free data service (block 840). For example, key validation device 250 may, after receiving the signed network address with the key identifier and the message, identify the security key associated with the key identifier (e.g., by requesting the security key from key agent 260). Key validation device 250 may apply a digital signature algorithm to the security key and the message to produce a validation signature, to be used for validation purposes. Key validation device 250 may include the key identifier associated with the security key in the validation signature. Key validation device 250 may compare the validation signature and the included key identifier to the network address signature and the included key identifier. If the validation signature and the included key identifier match the network address signature and the included key identifier, key validation device 250 may validate the new address, thereby determining that the signed network address is associated with the toll-free data service.

As shown in FIG. 8, process 800 may include determining billing information based on validating the network address (block 850). For example, key validation device 250 may determine that the signed network address is associated with the toll-free data service. In some implementations, key validation device 250 may collect billing information related to the toll-free data service (e.g., session time, data usage information, type of data transferred, or the like), and may process the billing information.

In some implementations, key validation device 250 may request, from authorization device 240, information related to the billing of the toll-free data service (e.g., one or more credentials of service provider device 220, the network address associated with the toll-free data service, the amount of data which the service provider agrees to subsidize, or the like). Key validation device 250 may use this information to determine billing information.

If key validation device 250 determines that the key identifier, the security key, or the network address signature is invalid, key validation device 250 may determine that the user (e.g., the user associated with user device 210) of the toll-free data service is to be billed. Additionally, or alternatively, if key validation device 250 determines that the key identifier, the security key, and the network address signature are all valid, key validation device 250 may determine that the service provider (e.g., the service provider associated with service provider device 220) of the toll-free data service is to be billed.

As shown in FIG. 8, process 800 may include providing the billing information (block 860). In some implementations, key validation device 250 may provide the billing information and/or information related to the billing of a toll-free data service to user device 210, service provider device 220, key management device 230, authorization device 240, billing device 270, or the like.

Billing device 270 may store, manage, and/or process the billing information. In some implementations, billing device 270 may determine a session time record. Additionally, or alternatively, billing device 270 may bill user device 210 and/or service provider device 220 based on the billing information. In some implementations, billing device 270 may bill the service provider for the full amount owed. In some implementations, billing device 270 may bill the user for the full amount owed. In some implementations, billing device 270 may bill the service provider for part of the amount owed, and may bill the user for part of the amount owed (e.g., the remaining amount). In this way, a network operator may bill an appropriate party for a toll-free data service based on validating the toll-free data service using a security key.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
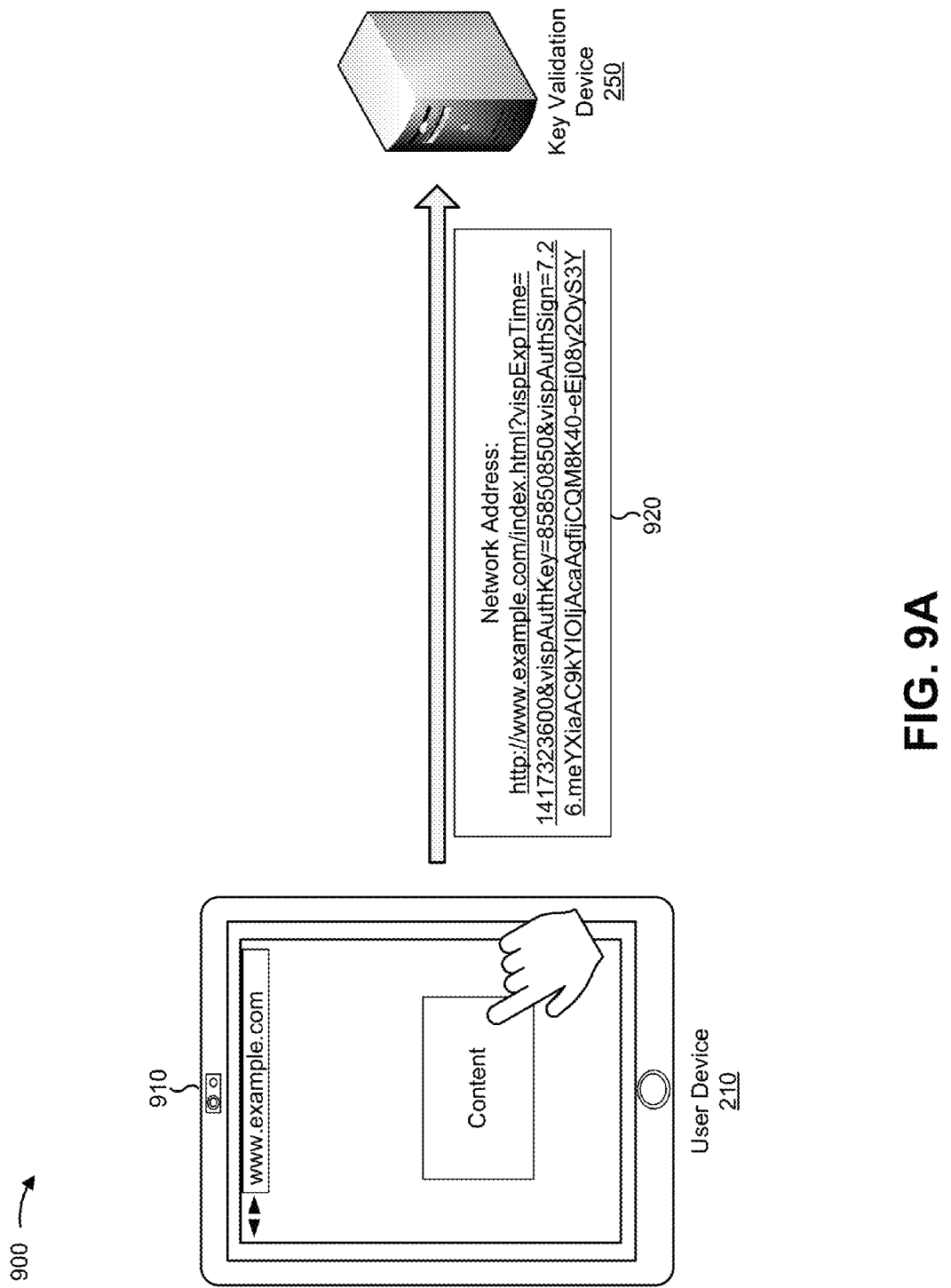

FIGS. 9A and 9B are diagrams of an example implementation 900 relating to process 800 shown in FIG. 8. As shown by example implementation 900, key validation device 250 may validate a network address, and may process billing information. For the purpose of FIGS. 9A and 9B, assume that the operations described herein in connection with FIG. 5 and FIG. 7 have been performed. Further, as shown by reference number 910, assume that user device 210 has requested toll-free content. Assume further that the network address has been signed by authorization device 240.

As shown by reference number 920, user device 210 may transmit a signed network address, including a key identifier and a message, to key validation device 250. In some implementations, service provider device 220 (rather than user device 210) may transmit the signed network address to key validation device 250.

As shown in FIG. 9B, and by reference number 930, key validation device 250 may receive the signed network address and the key identifier of 85850850. Assume that key validation device 250 determines the key identifier based on the string "vispAuthID=". As shown by reference number 940, key validation device 250 may provide the key identifier of 85850850 to key agent 260 to determine the security key. As shown by reference number 950, key validation device 250 may receive the security key, associated with the key identifier of 85850850, from key agent 260.

As shown by reference number 960, key validation device 250 may perform a digital signing algorithm on the security key and the message to produce a validation signature. As shown by reference number 970, key validation device 250 may compare the validation signature to the signed network address to confirm that the signed network address is associated with a toll-free data service. As shown, key validation device 250 may determine that the validation signature matches the signed network address. This may indicate that service provider 220 is to be billed for data associated with the toll-free data service. Assume that key validation device 250 determines billing information, based on the determination that service provider 220 is to be billed for the toll-free data service. As shown by reference number 980, key validation device 250 may provide the billing information to billing device 270.

As shown by reference number 990, billing device 270 may manage and/or store the billing information. In some implementations, billing device 270 may determine a session time record for the toll-free data service. As shown, billing device 270 may bill a service provider, associated with service provider device 220, based on the billing information. In this way, a user of user device 210 may access toll-free content, provided by a service provider, while the service provider is billed for data usage associated with the content.

As indicated above, FIGS. 9A and 9B are provided merely as an example. Other examples are possible and may differ from what was described with regard to FIGS. 9A and 9B.

Implementations described herein may permit a service provider to use a key management system to arrange a toll-free data service, and may permit a network operator to validate toll-free data services to facilitate charging a correct party for the toll-free data services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. In some implementations, the user interfaces may be customizable by a device and/or a user. Additionally, or alternatively, the user interfaces may be pre-configured to a standard configuration, a specific configuration based on a type of device on which the user interfaces are displayed, and/or a set of configurations based on capabilities and/or specifications associated with a device on which the user interfaces are displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described herein without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more devices to:
   receive a network address to be validated to determine whether the network address is associated with a toll-free data service;
   identify a key identifier associated with the network address,
      the key identifier corresponding to a security key used to create a network address signature associated with the network address;
   identify the security key corresponding to the key identifier;
   create a validation signature, using the security key, to determine whether the network address is valid;
   compare the validation signature and the network address signature;
   determine whether to bill a first party or a second party, for data usage associated with the toll-free data service, based on comparing the validation signature and the network address signature; and
   provide information that identifies whether to bill the first party or the second party for the data usage associated with the toll-free data service,
      the information being provided for billing the first party based on the validation signature matching the network address signature, or
      the information being provided for billing the second party based on the validation signature not matching the network address signature.

2. The system of claim 1, where the network address signature is created based on:
   a message received from a service provider device that provides the toll-free data service,
   the security key, and
   a digital signature algorithm applied to the message and the security key to create the network address signature.

3. The system of claim 1, where the security key is generated based on at least one of:
   a request for the security key from a service provider that provides the toll-free data service, or
   a determination that a threshold number of security keys are stored by a key management device.

4. The system of claim 1, where the network address signature is created by a service provider device associated with a service provider that provides the toll-free data service.

5. The system of claim 1, where the security key is generated by a key management device that is independent of a device that provides the toll-free data service.

6. The system of claim 1, where:
the first party is a service provider associated with a service provider device that provides the toll-free data service; and
the second party is a user associated with a user device that accesses the network address.

7. The system of claim 1, where the one or more devices are further to:
receive the security key, the security key being provided based on a request for the security key,
the request including a particular request identifier identifying a time associated with a previous security key request, and
the security key being generated after the time associated with the previous security key request.

8. A computer-readable medium storing instructions, the instructions comprising:
one or more instructions that, when executed by one or more processors, cause the one or more processors to:
receive a network address to determine whether the network address is associated with a toll-free data service;
identify a key identifier associated with the network address,
the key identifier corresponding to a security key used to create a network address signature associated with the network address;
identify the security key corresponding to the key identifier;
create a validation signature, using the security key, to determine whether the network address is associated with the toll-free data service;
compare the validation signature and the network address signature;
determine whether the network address is associated with the toll-free data service based on comparing the validation signature and the network address signature; and
provide information that identifies whether the network address is associated with the toll-free data service,
the information being provided for billing a service provider based on the validation signature matching the network address signature, or
the information being provided for billing a user based on the validation signature not matching the network address signature.

9. The computer-readable medium of claim 8, where the one or more instructions, that cause the one or more processors to identify the security key corresponding to the key identifier, cause the one or more processors to:
search a data structure using the key identifier; and
identify the security key based on searching the data structure.

10. The computer-readable medium of claim 8, where the one or more instructions, when executed by the one or more processors, further cause the one or more processors to:
collect information related to data usage of the toll-free data service; and
where the one or more instructions, that cause the one or more processors to provide the information that identifies whether the network address is associated with the toll-free data service, cause the one or more processors to:
provide the information related to the data usage of the toll-free data service.

11. The computer-readable medium of claim 8, where the one or more instructions, that cause the one or more processors to identify the key identifier associated with the network address cause the one or more processors to:
determine whether the key identifier is included in the network address; and
where the one or more instructions, that cause the one or more processors to determine whether the network address is associated with the toll-free data service, cause the one or more processors to:
determine whether the key identifier is included in the network address,
the network address being associated with the toll-free data service when the key identifier is included in the network address,
the network address not being associated with the toll-free data service when the key identifier is not included in the network address.

12. The computer-readable medium of claim 8, where the one or more instructions, that cause the one or more processors to determine whether the network address is associated with the toll-free data service, cause the one or more processors to:
determine a time period during which the network address is associated with the toll-free data service; and
determine whether the network address is associated with the toll-free data service based on the time period.

13. The computer-readable medium of claim 8, where the one or more instructions, that cause the one or more processors to determine whether the network address is associated with the toll-free data service, cause the one or more processors to:
determine whether the network address signature includes the key identifier;
determine whether the validation signature includes the key identifier;
compare the validation signature, including the key identifier, with the network address signature including the key identifier; and
determine that the network address is associated with the toll-free data service based on the validation signature, including the key identifier, matching the network address signature including the key identifier.

14. A method, comprising:
receiving, by one or more devices, a network address to be validated to determine whether the network address is associated with a toll-free data service;
identifying, by the one or more devices, a key identifier associated with the network address
the key identifier corresponding to a security key used to create a network address signature associated with the network address;
identifying, by the one or more devices, the security key corresponding to the key identifier;
creating, by the one or more devices and by using the security key, a validation signature to determine whether the network address is valid;
comparing, by the one or more devices, the validation signature and the network address signature;
determining, by the one or more devices, whether the network address is associated with the toll-free data service based on comparing the validation signature and the network address signature; and providing, by the one or more devices, information that identifies whether the network address is associated with the toll-free data service,
the information being provided for billing a service provider based on the validation signature matching the network address signature, or
the information being provided for billing a user based on the validation signature not matching the network address signature.

15. The method of claim 14, where creating the validation signature comprises:
identifying the security key;
determining a message used to create the network address signature; and
applying a digital signature algorithm to the security key and the message to create the validation signature.

16. The method of claim 14, further comprising:
collecting information related to data usage of the toll-free data service; and
providing the information related to the data usage of the toll-free data service.

17. The method of claim 14, further comprising:
applying a digital signature algorithm to the security key and a message to create the network address signature.

18. The method of claim 14, where identifying the security key further comprises:
receiving a request to generate the security key,
the request identifying the network address; and
generating the security key based on receiving the request.

19. The method of claim 18, where the request further identifies a time period during which the security key is valid; and
where determining whether the network address is associated with the toll-free data service comprises:
determining whether the security key used to create the network address signature is valid, based on the time period.

20. The method of claim 14, where creating the network address signature comprises:
applying a digital signature algorithm to the security key and a message used to create the network address signature; and
where creating the validation signature comprises:
identifying the security key;
identify the message used to create the network address signature; and
applying the digital signature algorithm, to the security key and the message, used to create the network address signature, to create the validation signature.

* * * * *